US009669882B2

(12) United States Patent
Allen

(10) Patent No.: US 9,669,882 B2
(45) Date of Patent: Jun. 6, 2017

(54) PANEL SEALING APPARATUS AND A METHOD OF ASSEMBLING THE PANEL SEALING APPARATUS

(71) Applicant: GM GLOBAL TECHNOLOGY OPERATIONS LLC, Detroit, MI (US)

(72) Inventor: Todd E. Allen, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/811,045

(22) Filed: Jul. 28, 2015

(65) Prior Publication Data

US 2017/0029041 A1 Feb. 2, 2017

(51) Int. Cl.
*B62D 31/02* (2006.01)
*B62D 25/02* (2006.01)
*B62D 27/02* (2006.01)
*B62D 65/06* (2006.01)

(52) U.S. Cl.
CPC ............. *B62D 31/02* (2013.01); *B62D 25/02* (2013.01); *B62D 27/02* (2013.01); *B62D 65/06* (2013.01)

(58) Field of Classification Search
CPC ........ B62D 31/02; B62D 65/06; B62D 27/02; B62D 25/02
See application file for complete search history.

(56) References Cited

U.S. PATENT DOCUMENTS

| | | | | |
|---|---|---|---|---|
| 2,049,363 A | * | 7/1936 | Fetter | B65D 45/32 292/256.63 |
| 2,091,859 A | * | 8/1937 | Johnson | B60J 10/30 403/387 |
| 3,174,576 A | * | 3/1965 | Woofter | B60K 37/02 174/72 A |
| 5,426,993 A | | 6/1995 | Bodo | |
| 5,448,138 A | * | 9/1995 | Staggs | H05B 39/00 315/248 |
| 5,549,098 A | * | 8/1996 | Bales | F24C 15/108 126/211 |
| 5,893,601 A | * | 4/1999 | Carlberg | B60N 2/4666 296/153 |
| 7,237,797 B2 | * | 7/2007 | Dailey | B60R 21/205 280/728.3 |
| 7,371,181 B2 | | 5/2008 | Kozlowski et al. | |
| 7,641,516 B1 | * | 1/2010 | Scott | H01R 13/2471 439/607.12 |

(Continued)

*Primary Examiner* — Darlene P Condra
(74) *Attorney, Agent, or Firm* — Quinn IP Law

(57) ABSTRACT

A method of assembling a panel sealing apparatus and the panel sealing apparatus includes a panel. The panel defines an aperture and a sealing assembly. The assembly includes a first component and a second component, with the second component at least partially surrounding the first component and is secured to the first component to form a unit. In certain embodiments, the assembly includes a plurality of clips disconnected from each other, each configured to be attached to the panel in the aperture separately from each other and attached to the panel separately from the unit. In other embodiments, the assembly includes a band and a plurality of clips each independently attachable to and detachable from the band, each of the clips configured to be attached to the panel in the aperture separately from the unit and the clips attached to the band before placement of the clips in the aperture.

8 Claims, 3 Drawing Sheets

(56) References Cited

U.S. PATENT DOCUMENTS

| | | |
|---|---|---|
| 8,469,399 B2 | 6/2013 | Allen |
| 8,925,959 B2* | 1/2015 | Bosch .................. B60R 21/203 280/728.3 |
| 2001/0002965 A1* | 6/2001 | Ibe ........................ B60R 13/005 403/321 |
| 2003/0047886 A1* | 3/2003 | Muhle .................... F16K 1/226 277/650 |
| 2006/0108782 A1* | 5/2006 | Kanazawa .......... B60R 13/0846 280/779 |
| 2006/0110643 A1* | 5/2006 | Sakano ................ H01M 8/247 429/457 |
| 2008/0073885 A1* | 3/2008 | Cowelchuk ........... B60R 21/205 280/728.3 |
| 2010/0212252 A1* | 8/2010 | Chou ..................... B60R 13/04 52/716.5 |
| 2012/0056344 A1* | 3/2012 | Richardson ........... E04B 1/6116 264/35 |
| 2013/0093141 A1* | 4/2013 | Guellec .................... B60J 10/33 277/637 |
| 2013/0152714 A1* | 6/2013 | Imaoka ............... F16H 19/0618 74/37 |
| 2014/0099049 A1 | 4/2014 | Allen |
| 2014/0144277 A1* | 5/2014 | Kakishita ............... B62D 1/187 74/493 |
| 2014/0197663 A1* | 7/2014 | Takayama ................. B60J 1/10 296/201 |
| 2015/0336529 A1* | 11/2015 | Nebel ................. B60R 21/2037 280/728.2 |
| 2016/0016522 A1* | 1/2016 | Smith ................... F16B 37/043 296/35.1 |

* cited by examiner

PANEL SEALING APPARATUS AND A METHOD OF ASSEMBLING THE PANEL SEALING APPARATUS

TECHNICAL FIELD

The present disclosure relates to a panel sealing apparatus and a method of assembling the panel sealing apparatus.

BACKGROUND

Vehicles can include a dash panel or bulkhead that separates a passenger compartment from an engine compartment. A steering shaft passes through a hole in the dash panel such that a portion of the steering shaft is disposed in the passenger compartment and another portion of the steering shaft is disposed in the engine compartment. A steering wheel is attached to the steering shaft and disposed in the passenger compartment to allow a user to steer the vehicle. A seal is disposed about the steering shaft to minimize fluid communication between the passenger compartment and the engine compartment via the hole in the dash panel. During assembly, the seal is bolted to the dash panel which requires a larger packaging space. Alternatively, a compression seal can be utilized which has two pieces, one piece to overlap one side of the dash panel and another piece to overlap the other side of the dash panel. However, the compression seal can shift during assembly or use due to dynamic loads or different sized steering shafts being utilized which can allow excess fluid communication through the hole of the dash panel.

SUMMARY

The present disclosure provides a panel sealing apparatus including a panel defining an aperture and a sealing assembly. The sealing assembly includes a first component formed of an elastomeric material and a second component formed of a rigid material. The second component at least partially surrounds the first component and is secured to the first component to form a unit. The sealing assembly further includes a plurality of clips disconnected from each other and each configured to be attached to the panel in the aperture separately from each other and attached to the panel separately from the unit. The unit is attached to the clips to couple the unit to the panel after placement of the clips in the aperture.

In another embodiment, the panel sealing apparatus includes the sealing assembly which includes a band and a plurality of clips each independently attachable to and detachable from the band. Each of the clips are configured to be attached to the panel in the aperture separately from the unit. The clips are attached to the band before placement of the clips in the aperture. The unit is attached to the clips to couple the unit to the panel after placement of the clips in the aperture.

The present disclosure also provides a method of assembling a panel sealing apparatus. The method includes attaching a plurality of clips independently of each other to a band and attaching each of the clips to a panel in an aperture of the panel separately from a unit. Attaching the clips to the band occurs before attaching each of the clips to the panel. The method also includes attaching the unit to the clips after attaching the clips to the panel in the aperture. The unit includes a first component formed of an elastomeric material and a second component at least partially surrounding the first component and secured to the first component. The second component is formed of a rigid material.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that terms such as "above", "below", "upward", "up", "downward", "down", "top", "bottom", "left", "right", "back", "forth", etc., are used descriptively for the figures, and do not represent limitations on the scope of the disclosure, as defined by the appended claims.

Figure 1:
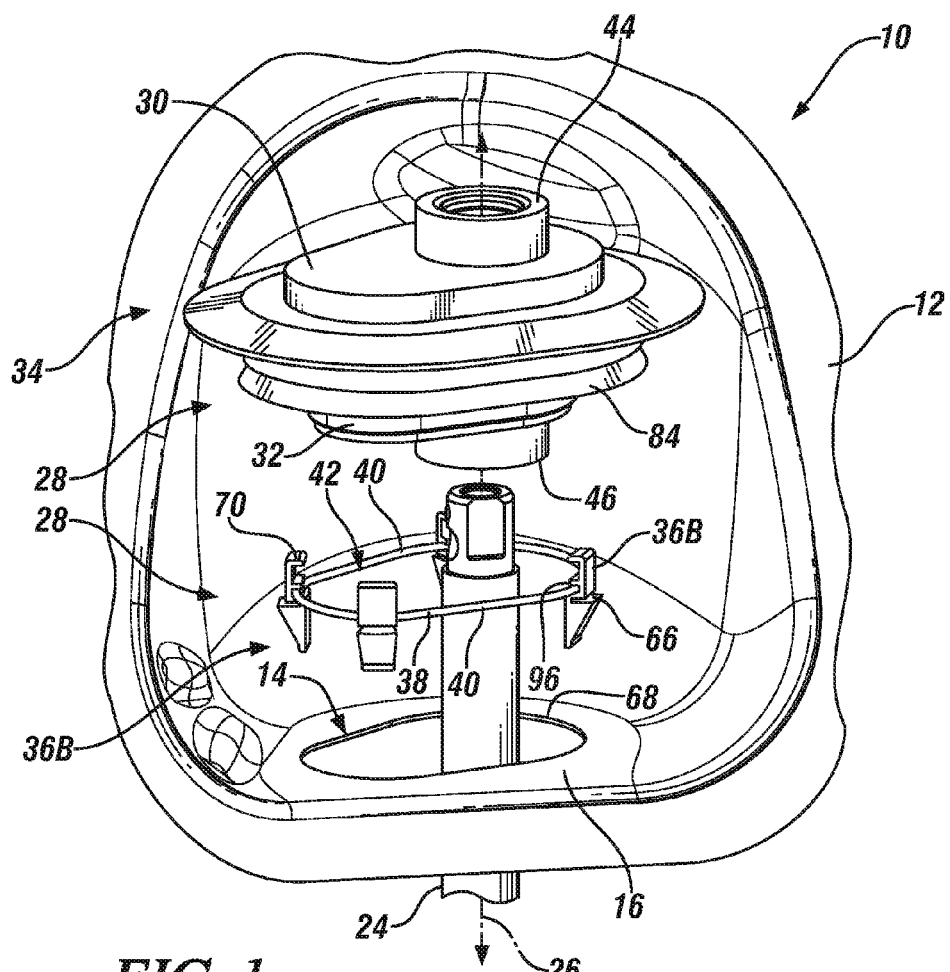
FIG. 1 is a schematic exploded perspective view of a panel, a shaft and a plurality of clips attached to a band.

Referring to the Figures, wherein like numerals indicate like or corresponding parts throughout the several views, a panel sealing apparatus 10 is generally shown in FIG. 1. The panel sealing apparatus 10 can be utilized in many different applications. For example, the panel sealing apparatus 10 can be utilized in a vehicle application or a non-vehicle application. Therefore, in certain embodiments, the panel sealing apparatus 10 is for a vehicle, such as a car, a truck, a tractor, a boat, etc.

Figure 2:
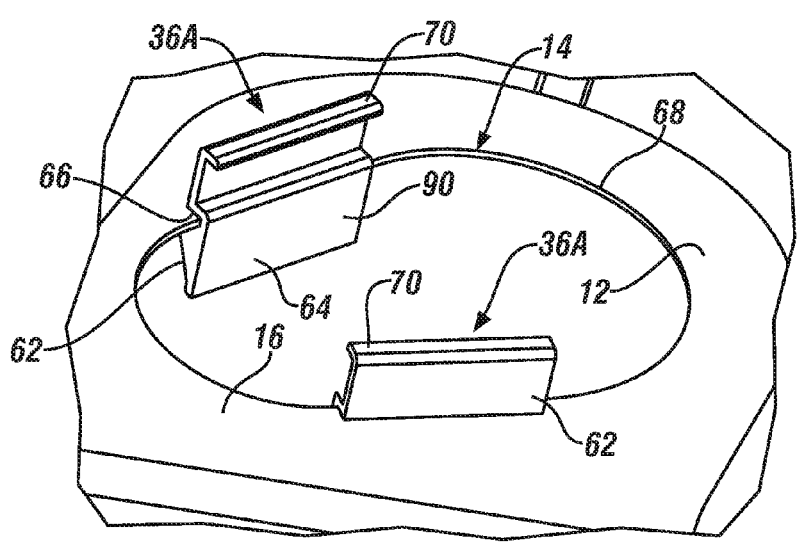
FIG. 2 is a schematic fragmentary perspective view of the panel and a plurality of clips attached to the panel without a band.
Figure 3:
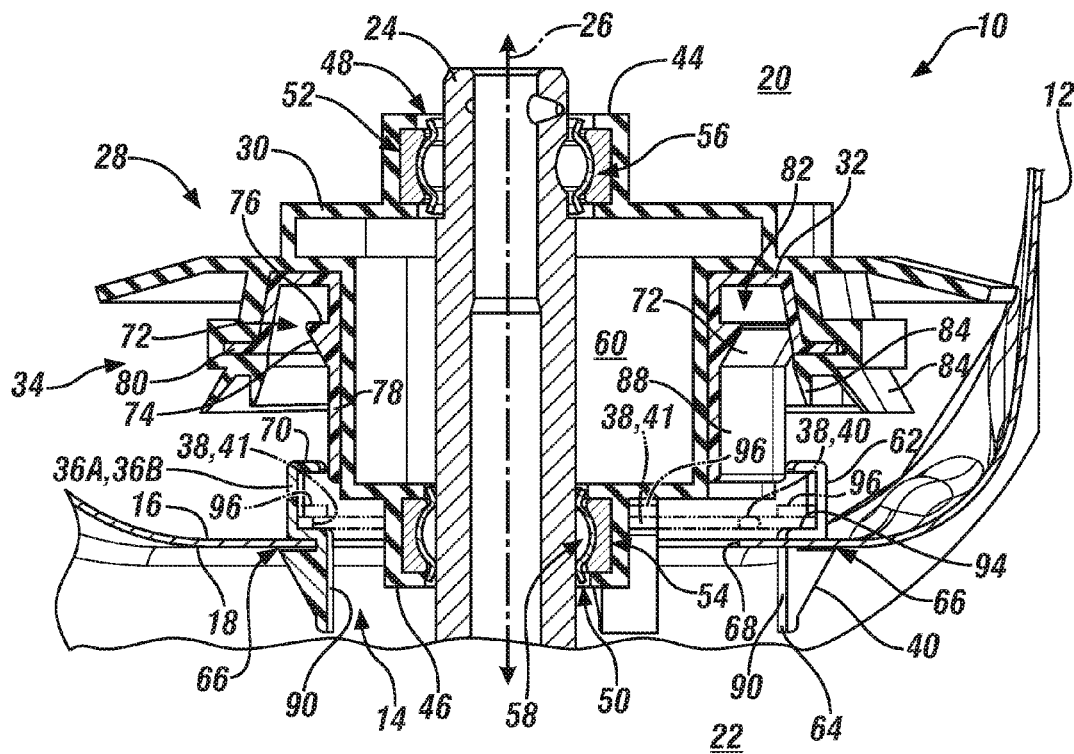
FIG. 3 is a schematic fragmentary cross-sectional view of the clips attached to the panel and a unit detached from the clips.

Continuing with FIGS. 1 and 2, the panel sealing apparatus 10 includes a panel 12 defining an aperture 14. The panel 12 can be any suitable configuration, and FIGS. 1 and 2 illustrate one suitable configuration. Turning to FIG. 3, the panel 12 can include a first surface 16 and a second surface 18 opposing each other. When the panel 12 is utilized in the vehicle application, the first surface 16 can generally face a passenger compartment 20 of the vehicle and the second surface 18 can generally face an engine compartment 22 of the vehicle. The passenger compartment 20 can contain one or more seats for passenger(s) to utilize. The engine compartment 22 can contain one or more of an engine, a transmission, etc. Alternatively, instead of the engine compartment 22, the second surface 18 can generally face a storage compartment. Therefore, in the vehicle application, the panel 12 can at least partially split apart the passenger compartment 20 and the engine compartment 22/storage compartment. In the vehicle application, the panel 12 can be referred to as a dash panel, and the dash panel can define the aperture 14.

The panel sealing apparatus 10 can further include a shaft 24 disposed through the aperture 14 of the panel 12 along a longitudinal axis 26. For example, in the vehicle application, the shaft 24 can be a steering column and the steering column is disposed through the aperture 14. A steering wheel is attached to the steering column and the steering wheel is disposed in the passenger compartment 20 to allow one of the passengers to steer the vehicle. When the shaft 24 is the steering column, the steering column is selectively rotatable about the longitudinal axis 26. Therefore, in certain embodiments, the shaft 24 is selectively rotatable about the longitudinal axis 26.

Figure 4:
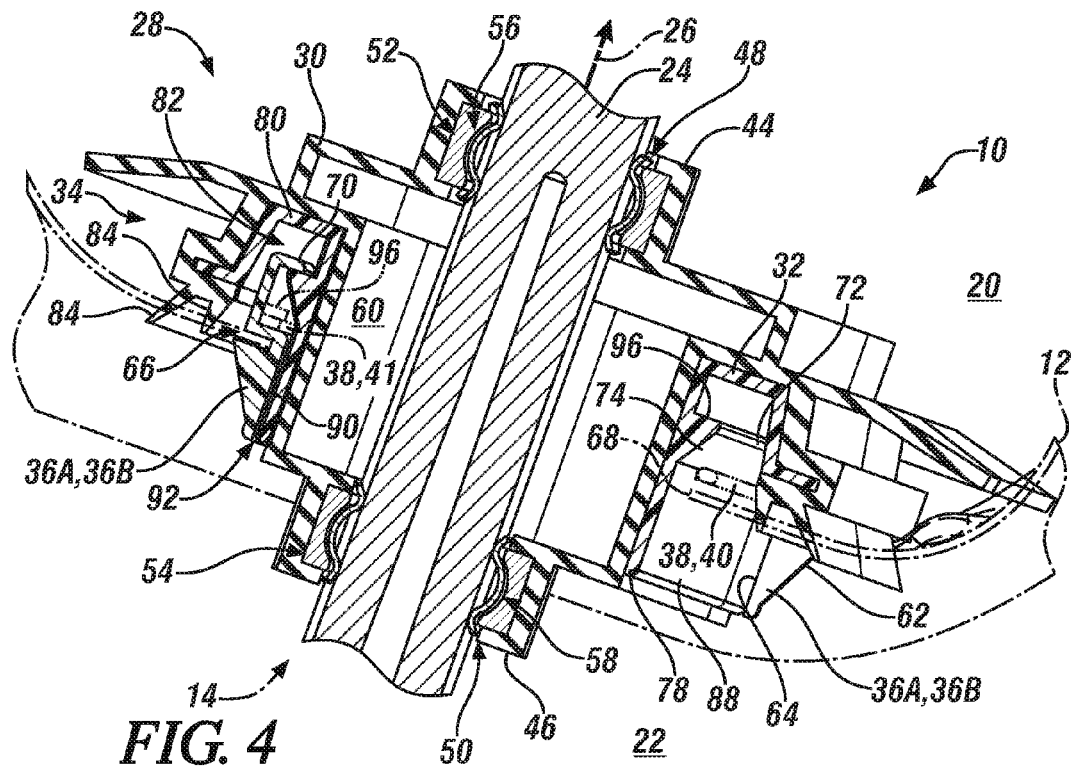
FIG. 4 is a schematic fragmentary cross-sectional view of the clips attached to the panel and the unit attached to the clips.

Referring to FIGS. 1, 3 and 4, the panel sealing apparatus 10 further includes a sealing assembly 28. The sealing assembly 28 includes a first component 30 formed of an elastomeric material and a second component 32 formed of a rigid material. The elastomeric material of the first component 30 can be any suitable flexible material. For example, the elastomeric material of the first component 30 can be rubber. The first component 30 can be referred to as a rubber boot. The rigid material of the second component 32 can be any suitable material that generally allows the second component 32 to maintain its configuration. For example, the rigid material of the second component 32 can be plastic or metal.

The second component 32 at least partially surrounds the first component 30 and is secured to the first component 30 to form a unit 34. Generally, the shaft 24 is disposed through the unit 34 as further discussed below. In the vehicle application, the steering column is disposed through the unit 34. For example, the first and second components 30, 32 can be molded to each other, such as by injection molding, etc. The first and second components 30, 32 can be molded at the same time or one of the components 30, 32 can be molded to the other one of the components 30, 32. As another example, the first and second components 30, 32 can be secured to each other by adhesive, etc.

Referring to FIGS. 1 and 2, the sealing assembly 28 further includes a plurality of clips 36A, 36B configured to be attached to the panel 12 in the aperture 14 separately from the unit 34. The unit 34 is attached to the clips 36A, 36B after placement of the clips 36A, 36B in the aperture 14 to couple the unit 34 to the panel 12, or in the vehicle application, couple the unit 34 to the dash panel. Therefore, once the clips 36A, 36B are attached to the panel 12, the unit 34 is then attached to the clips 36A, 36B in a separate operation. Generally, the clips 36A, 36B support the unit 34 to maintain the second component 32 relative to the clips 36A, 36B. A portion of the clips 36A, 36B is formed of a thickness and/or material(s) that generally allow the clips 36A, 36B to maintain its position/configuration and can generally support the unit 34. Each of the clips can be referred to as a snap-fit connector.

FIG. 2 illustrates the clips 36A attached to the panel 12 in the aperture 14. FIGS. 3 and 4 illustrate the common features of both clips 36A, 36B in solid lines and the features of clips 36B that are different from clips 36A in phantom lines. FIG. 3 also illustrates the clips 36A, 36B attached to the panel 12 in the aperture 14 and the unit 34 detached from the clips 36A, 36B. FIG. 4 illustrates the unit 34 attached to the clips 36A, 36B. By attaching the clips 36A, 36B to the panel 12 first, the effort to attach the unit 34 to clips 36A, 36B to couple the unit 34 to the panel 12 is reduced, which reduces fatigue during installation.

Referring to FIG. 2, the clips 36A are disconnected from each other. Each of the clips 36A are completely separate from each other, and therefore, one clip 36A is attached to the panel 12 in the aperture 14 separately and independently of another clip 36B. Each of the clips 36A are configured to be attached to the panel 12 in the aperture 14 separately from each other and attached to the panel 12 separately from the unit 34. The unit 34 is attached to the clips 36A to couple the unit 34 to the panel 12 after placement of the clips 36A in the aperture 14.

Referring to FIG. 1, the sealing assembly 28 includes a band 38 and the clips 36B are each independently attachable to and detachable from the band 38. Each of the clips 36B are configured to be attached to the panel 12 in the aperture 14 separately from the unit 34. The clips 36B are attached to the band 38 before placement of the clips 36B in the aperture 14. The unit 34 is attached to the clips 36B to couple the unit 34 to the panel 12 after placement of the clips 36B in the aperture 14. When the clips 36B are attached to the band 38, each of the clips 36B are coupled to a common component, while the clips 36A are not. Therefore, when comparing the clips 36A of FIG. 2 with the clips 36B of FIG. 1, the clips 36A of FIG. 2 do not utilize the band 38.

Each of the clips 36A, 36B are attached to the panel 12 in the aperture 14 (see FIGS. 2-4). In certain embodiments, each of the clips 36B are spaced from each other about the band 38 (see FIG. 1). The clips 36B are adjustable about the band 38 by disconnecting and reattaching the respective clip 36B in another location about the band 38. One clip 36B is illustrated detached from the band 38 in FIG. 7. Generally, the band 38 can be continuous or non-continuous. The band 38 of FIG. 1 is continuous such that the clips 36B can be selectively attached and detached from the band 38.

Figure 7:
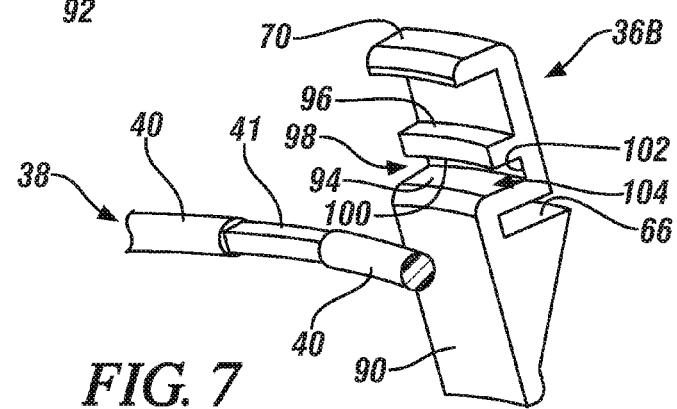
FIG. 7 is an exploded perspective view of the clip and the band of FIG. 1.

The band 38 can be any suitable configuration and FIG. 7 best illustrates one non-limiting example. The band 38 can include a first configuration 40 having a generally circular cross-sectional shape and a second configuration 41 having a generally square cross-sectional shape. The clips 36B are attached to the band 38 along the second configuration 41. The first and second configurations 40, 41 alternate around the band 38. When the second configuration 41 is different from the first configuration 40, the difference can provide a visual cue during attachment of the clips 36B to the band 38 if desired for certain applications. It is to be appreciated that any suitable number of clips 36B can be attached to the band 38, i.e., one or more, and the clip(s) 36B can be in any suitable location about the band 38. The clips 36B and the band 38 can be attached to each other by as further discussed below or by fasteners, etc.

The clips 36A, 36B can be formed of a polymeric material. The band 38 can also be formed of a polymeric material. For example, the polymeric material of the clips 36A, 36B and the band 38 can be plastic. The band 38 can be formed of the same or different polymeric material as the clips 36A, 36B. As another example, the clips 36A, 36B can be formed of metal, such as spring steel. It is to be appreciated that the clips 36A, 36B and the band 38 can be formed of any suitable material(s), and above are non-limiting examples.

The band 38 allows movement of the clips 36B relative to each other to provide adjustability of the clips 36B when attaching the clips 36A, 36B to the panel 12 in the aperture 14. The band 38 can be flexible and/or movable to allow movement of the clips 36B relative to each other. For example, the band 38 can be narrow (as shown in the Figures) which allows the band 38 to flex and move.

As best shown in FIG. 1, the band 38 can define an opening 42 that generally complements the aperture 14 of the panel 12. It is to be appreciated that the band 38 can be any suitable configuration. When the clips 36B are attached to the aperture 14 in the opening 42, the opening 42 generally aligns with the aperture 14 and the shaft 24 can extend through both the opening 42 and the aperture 14. Furthermore, the unit 34 can extend through both the opening 42 and the aperture 14.

Referring to FIGS. 3 and 4, the first component 30 can include a first end 44 and a second end 46 spaced from each other. The first end 44 can define a first hole 48 along the longitudinal axis 26 for receiving the shaft 24. The second end 46 can define a second hole 50 along the longitudinal axis 26 for receiving the shaft 24. Generally, the first end 44 faces into the passenger compartment 20 and the second end 46 faces into the engine compartment 22.

Continuing with FIGS. 3 and 4, the first component 30 can define a first pocket 52 adjacent to the first end 44. The first component 30 can define a second pocket 54 adjacent to the second end 46. A first bearing 56 or bushing can be secured to the first component 30 in the first pocket 52, with the shaft 24 disposed through the first bearing 56. In certain embodiments, a second bearing 58 or bushing can be secured to the second component 32 in the second pocket 54, with the shaft 24 disposed through the second bearing 58. The first and second bearings 56, 58 minimize frictional engagement between the first component 30 and the shaft 24 when the shaft 24 rotates. The first and second bearings 56, 58 can be spaced from each other. For example, in certain embodiments, the first bearing 56 is disposed along the passenger compartment 20 side of the panel 12 and the second bearing 58 is disposed along the engine compartment 22 side of the panel 12. It is to be appreciated that the first and second pockets 52, 54, as well as the first and second bearings 56, 58 can be in any suitable location.

The first component 30 can define a cavity 60 between the first and second ends 44, 46. In certain embodiments, the cavity 60 is disposed between the first and second pockets 52, 54. The cavity 60 allows movement of the first component 30 to adjust for build variations, different shaft diameters, shaft tolerances, or coupling the shaft 24 with other components.

For both configurations of the clips 36A, 36B, when the sealing assembly 28 is attached or secured to the panel 12 and the shaft 24 is disposed through the first and second ends 44, 46 of the first component 30, the sealing assembly 28 and the shaft 24 cooperate to minimize communication through the aperture 14 of the panel 12. Therefore, sound or noise, debris, water, fluid, etc., between the engine compartment 22 and the passenger compartment 20 is minimized through the aperture 14 when the sealing assembly 28 is attached or secured to the panel 12 and the shaft 24 is disposed through the first and second ends 44, 46 of the first component 30.

During assembly of the embodiment without the band 38, the unit 34 is inserted in into the aperture 14 of the panel 12, and continues into engagement with the clips 36B which couples the unit 34 to the panel 12 through the clips 36B, and the final position of the unit 34 minimizes communication through the aperture 14. During assembly of the embodiment with the band 38, the unit 34 is inserted in the opening 42 of the band 38 and into the aperture 14 of the panel 12, and continues into engagement with the clips 36A which couples the unit 34 to the panel 12 through the clips 36A. The unit 34 is inserted in the opening 42 of the band 38 to minimize communication through the aperture 14. Said differently, the unit 34 is inserted in the opening 42 of the band 38 to impede or obstruct the aperture 14. Therefore, the final position of the unit 34 minimizes communication through the aperture 14.

Referring to FIGS. 1-7, each of the clips 36A, 36B can include a first side 62 and a second side 64 opposing the first side 62. The first side 62 of each of the clips 36A, 36B can define a slot 66 to receive the panel 12 which attaches the clips 36A, 36B to the panel 12. Therefore, the slot 66 of each of the clips 36A, 36B captures an edge 68 of the panel 12 adjacent to the aperture 14 of the panel 12. As such, the slot 66 of the clips 36A, 36B is open to receive the edge 68 of the panel 12. When the clips 36A, 36B are attached to the panel 12, a portion of the clips 36A, 36B overlap a portion of the panel 12. During assembly, the panel 12 engages each of the clips 36A, 36B in the slot 66 which maintains the position of the clips 36A, 36B relative to the panel 12 so that the next operation can be performed without having to readjust the clips 36A, 36B. In other embodiments, the second side 64 of each of the clips 36A, 36B can define the slot 66. It is to be appreciated that the slot 66 can be in any suitable location on the clips 36A, 36B.

When the clips 36A, 36B are attached to the panel 12, a first portion of each of the clips 36A, 36B extend toward the passenger compartment 20 and a second portion of each of the clips 36A, 36B extend toward the engine compartment 22. In other words, the first portion of each of the clips 36A, 36B extend outwardly away from the first surface 16 of the panel 12 and the second portion of each of the clips 36A, 36B extend outwardly away from the second surface 18 of the panel 12. Specifically, referring to FIGS. 3 and 4, the first portion of the clips 36A, 36B extend generally along the longitudinal axis 26 toward the passenger compartment 20 and the second portion of the clips 36A, 36B extend generally along the longitudinal axis 26 toward the engine compartment 22.

Figure 5:
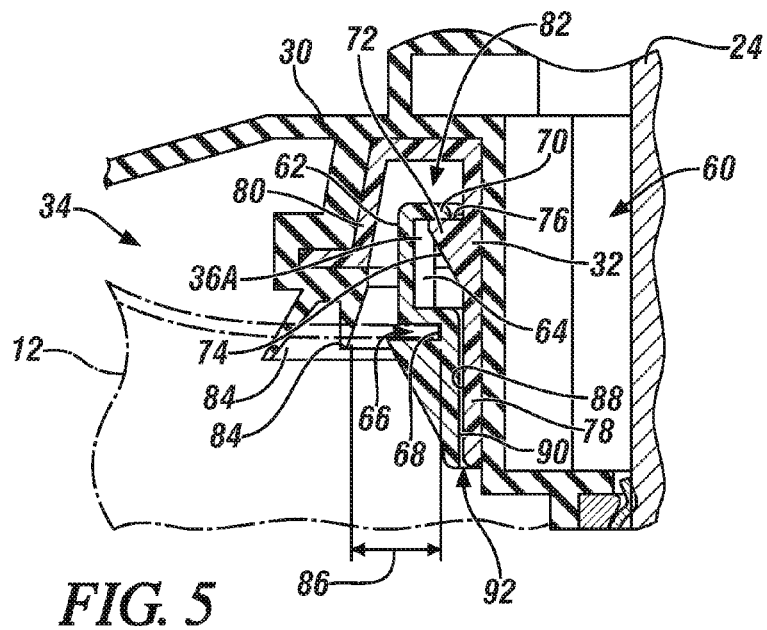
FIG. 5 is a schematic fragmentary enlarged cross-sectional view of the clip of FIG. 2, with the unit attached to the illustrated clip.
Figure 6:
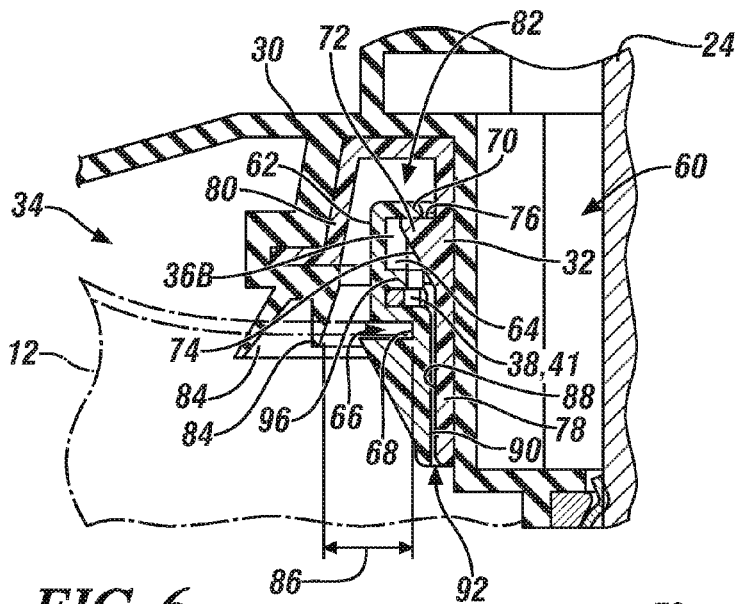
FIG. 6 is a schematic fragmentary enlarged cross-sectional view of the clip of FIG. 1, with the unit attached to the illustrated clip.

As best shown in FIGS. 5 and 6, each of the clips 36A, 36B includes a tab 70. Generally, the tab 70 of the clips 36A, 36B face outwardly away from the first side 62. The second component 32 engages the tab 70 of each of the clips 36A, 36B to attach the unit 34 to the clips 36A, 36B. Specifically, during attachment of the unit 34 to the clips 36A, 36B, the second component 32 engages the tab 70. Therefore, as the unit 34 is inserted through the aperture 14, the tabs 70 engage the second component 32 and attach the unit 34 to the clips 36A, 36B. Generally, the tabs 70 bias back as the unit 34 is being inserted through the aperture 14 and once the unit 34 is in its final position, the tabs 70 bias forward to attach the unit 34 to the clips 36A, 36B. The tab 70 of each of the clips 36A, 36B is formed of a thickness and/or material(s) that allow the tabs 70 to bias back and forth, as well as attach the unit 34 to the clips 36A, 36B, and thus, maintain the unit 34 secured to the clips 36A, 36B when the unit 34 is attached to the clips 36A, 36B. In certain embodiments, the tab 70 can face away from the first side 62. In other embodiments, the tab 70 can face away from the second side 64. It is to be appreciated that the tab 70 can be in any suitable location on the clips 36A, 36B.

Referring to FIGS. 3-6, the second component 32 can include a lip 72 facing the clips 36A, 36B. The lip 72 engages the tab 70 of each of the clips 36A, 36B to attach the unit 34 to the clips 36A, 36B. Specifically, the lip 72 can include a ramp 74 and a platform 76. The tab 70 of each of the clips 36A, 36B can bias along the ramp 74 and the platform 76 to attach the unit 34 to the clips 36A, 36B. Specifically, the tab 70 of each of the clips 36A, 36B can move back and forth as the lip 72 of the second component 32 engages respective tabs 70 during attachment of the unit 34 to the clips 36A, 36B. Therefore, as the unit 34 is being inserted through the aperture 14, the tab 70 of each of the clips 36A, 36B ride along the ramp 74 to bias outwardly away from the longitudinal axis 26 and once the tab 70 of each of the clips 36A, 36B reach the platform 76, the tab 70 of each of the clips 36A, 36B bias toward the longitudinal axis 26 such that a portion of the tab 70 of each of the clips 36A, 36B overlap a portion of the platform 76. The overlapping engagement of the tab 70 and the platform 76 attaches or secures together the unit 34 and the clips 36A, 36B, and more specifically, couples or secures the sealing assembly 28 to the panel 12. The configuration of the clips 36A, 36B and the lip 72 of the second component 32 cooperate to reduce the amount of effort needed to couple the sealing assembly 28 to the panel 12 during assembly.

Continuing with FIGS. 3-6, the second component 32 can include a body 78 and a flange 80 extending from the body 78. The flange 80 can overlap a portion of the body 78 in a spaced relationship to present a space 82 that allows the tab 70 of each of the clips 36A, 36B to bias therein. The lip 72 can be continuous or non-continuous about the body 78 of the second component 32. When the lip 72 is non-continuous, the clips 36A, 36B align with the lip 72.

The lip 72 can be partially or entirely disposed in the space 82. For example, the ramp 74 can be at least partially disposed in the space 82 and the platform 76 can be disposed in the space 82. During assembly, as the unit 34 is inserted into the aperture 14 of the panel 12, the tab 70 of each of the clips 36A, 36B enters the space 82 and engages the platform 76 in the space 82 as best shown in FIGS. 5 and 6.

The first component 30 can include at least one sealing lip 84 (see FIGS. 5 and 6). In certain embodiments, the first component 30 can include a plurality of sealing lips 84. The sealing lips 84 engage the first surface 16 of the panel 12 when the unit 34 is attached to the clips 36A, 36B to minimize communication through the aperture 14 of the panel 12. Utilizing the sealing assembly 28 described herein can reduce the amount of space 82 utilized for the interface between the panel 12 and the sealing assembly 28. Specifically, the clips 36A, 36B and the unit 34 are designed to allow a distance 86 between the edge 68 of the panel 12 and the sealing lip 84 proximal to the edge 68 of the panel 12 to be decreased, which reduces the amount of packaging space 82 utilized with the sealing assembly 28. For example, the distance 86 can be from about 8.0 millimeters to about 10.0 millimeters.

Continuing with FIGS. 5 and 6, the body 78 of the second component 32 can have an outer surface 88 facing the second side 64 of each of the clips 36A, 36B. At least a portion of the outer surface 88 and at least a portion of the second side 64 of each of the clips 36A, 36B are complementary to each other to limit movement of the second component 32 relative to the clips 36A, 36B. Specifically, the second side 64 of each of the clips 36A, 36B can include an abutment 90 and when the body 78 of the second component 32 engages the abutment 90, the abutment 90 limits movement of the second component 32. The portion of the second side 64 can be further defined as the abutment 90. For example, when the unit 34 is attached to the clips 36A, 36B and the shaft 24 shifts inside the aperture 14, the second component 32 can slightly move radially relative to the longitudinal axis 26 into engagement with the abutment 90, and this engagement will prevent further radially movement of the second component 32 in that direction.

The abutment 90 can be any suitable configuration. For example, if the clips 36A, 36B align with a curved portion of the body 78, the abutment 90 can be curved to complement that portion of the body 78. As another example, if the clips 36A, 36B align with a flat portion of the body 78, the abutment 90 can be flat to complement that portion of the body.

The outer surface 88 and the abutment 90 can define a small gap 92 therebetween such that engagement between the outer surface 88 and the abutment 90 is minimized during assembly of the unit 34 to the clips 36A, 36B. Minimizing engagement between the unit 34 and the clips 36A, 36B during assembly, reduces the effort utilized to assemble these parts 34, 36A, 36B. In other words, minimizing frictional engagement between the outer surface 88 of the second component 32 and the abutment 90 of the clips 36A, 36B reduces the effort utilized to assembly the unit 34 to the clips 36A, 36B.

Turning to FIGS. 6 and 7, each of the clips 36B can include a plate 94 and a tooth 96 spaced from the plate 94 to define a groove 98 between the tooth 96 and the plate 94. Generally, the groove 98 is open to selectively receive the band 38. The slot 66 is spaced from the groove 98, and specifically, the slot 66 and the groove 98 face in opposite directions relative to each other.

The groove 98 can be any suitable configuration to secure the clips 36B to the band 38. For example, the groove 98 can have rounded corners or square corners. The shape of the groove 98 can complement the shape of the band 38 along the second configuration 41. The configurations of the groove 98 and the band 38 allows the clips 36B to be able to swing or rotate relative to the band 38 which provides adjustability when attaching the clips 36B to the panel 12. A bottom side 100 of the tooth 96 can face the plate 94, and a back wall 102 is disposed in the groove 98 which is disposed transverse to the side 100 of the tooth 96. The plate 94 can include an inner surface 104 facing the bottom side 100. In one embodiment, the inner surface 104 and the bottom side 100 are substantially parallel to each other in a spaced relationship. Furthermore, in certain embodiments, the back wall 102 is substantially perpendicular to the bottom side 100 and/or the inner surface 104.

The sealing assembly 28 described herein improves sealing performance of the aperture 14. Furthermore, the sealing assembly 28 provides ergonomic benefits by reducing the effort needed to couple the sealing assembly 28 to the panel 12. These ergonomic benefits can also reduce worker fatigue and reduce assembly time. Specifically, the force utilized to attach the unit 34 to the clips 36A, 36B is reduced to 85.0 newton or lower by utilizing the sealing assembly 28 described herein.

The present disclosure also provides a method of assembling the panel sealing apparatus 10. The method includes attaching the clips 36A, 36B to the panel 12 in the aperture 14 of the panel 12 and attaching the unit 34 to the clips 36A, 36B after attaching the clips 36A, 36B to the panel 12 in the aperture 14. Therefore, the clips 36A, 36B and the unit 34 are assembled in two separate operations which reduce the amount of effort utilized to couple the sealing assembly 28 to the panel 12. As discussed above, the unit 34 includes the first component 30 formed of the elastomeric material and the second component 32 at least partially surrounding the first component 30 and secured to the first component 30. As also discussed above, the second component 32 is formed of the rigid material.

In one embodiment, the method includes attaching the clips 36B independently of each other to the band 38. Therefore, in this embodiment, each of the clips 36B are attached to the panel 12 in the aperture 14 of the panel 12 separately from the unit 34. Attaching the clips 36B to the band 38 occurs before attaching each of the clips 36B to the panel 12. As similarly discussed above, for this embodiment, the unit 34 is attached to the clips 36B after attaching the clips 36B to the panel 12 in the aperture 14.

Attaching the clips 36A, 36B to the panel 12 can include engaging the clips 36A, 36B with the panel 12. Furthermore, engaging the clips 36A, 36B with the panel 12 can include moving the clips 36A, 36B toward the panel 12 such that the panel 12 is disposed in the slot 66 of each of the clips 36A, 36B to engage the clips 36A, 36B with the panel 12. Attaching the clips 36A, 36B to the panel 12 maintains the position of the clips 36A, 36B so that the next operation can be performed, i.e., so the unit 34 can then be attached to the clips 36A, 36B. The slot 66 of each of the clips 36A, 36B are moved into engagement with the edge 68 of the panel 12 without the unit 34 interfering with the placement or engagement of the clips 36A, 36B. Therefore, the clips 36A, 36B are attached to the panel 12 with low effort.

Attaching the unit 34 to the clips 36A, 36B can include engaging the lip 72 of the second component 32 with the tab 70 of each of the clips 36A, 36B to attach the unit 34 to the clips 36A, 36B. Furthermore, attaching the unit 34 to the clips 36A, 36B can also include inserting the unit 34 in the aperture 14 such that the clips 36A, 36B at least partially surround the second component 32. In one embodiment, attaching the unit 34 to the clips 36B can also include inserting the unit 34 in the aperture 14 and the opening 42 of the band 38. Therefore, once the clips 36A, 36B are placed, the force to snap the unit 34 into the clips 36A, 36B is reduced to about 85.0 newton or lower. This reduced amount of force improves worker ergonomics during assembly.

In certain embodiments, inserting the unit 34 in the aperture 14 can include inserting the unit 34 in the aperture 14 from the first surface 16 of the panel 12 toward the second surface 18 of the panel 12. Generally, the first surface 16 cooperates with the passenger compartment 20. Therefore, during assembly, the unit 34 is inserted in the aperture 14 from the passenger compartment 20, i.e., the unit 34 moves toward the engine compartment 22 from the passenger compartment 20 side of the panel 12. As best shown in FIG. 1, the configuration of features of the unit 34 allows insertion of the unit 34 into the aperture 14 from one direction.

The method can also include inserting the shaft 24 through the unit 34 after attaching the unit 34 to the clips 36A, 36B. Therefore, the sealing assembly 28 is coupled to the panel 12 before the shaft 24 is disposed through the sealing assembly 28. As such, during assembly, the clips 36A, 36B are attached to the panel 12, then the unit 34 is attached to the clips 36A, 36B, and then the shaft 24 is inserted through the unit 34. Specifically, inserting the shaft 24 through the unit 34 can include inserting the shaft 24 through the first and second holes 48, 50, the first and second pockets 52, 54 and the cavity 60. The shaft 24 abuts the first and second bearings 56, 58 inside the unit 34. Specifically, the bearings 56, 58 surround the shaft 24 once the shaft 24 is inserted through the sealing assembly 28.

Alternatively, the method can include inserting the shaft 24 through the aperture 14 of the panel 12 before attaching the clips 36A, 36B to the panel 12, and thus before attaching the unit 34 to the clips 36A, 36B. Therefore, once the shaft 24 is in place through the aperture 14, the clips 36A, 36B are attached to the panel 12. Once the clips 36A, 36B are attached to the panel 12, then the unit 34 is attached to the clips 36A, 36B. As the unit 34 is attached to the clips 36A, 36B, the shaft 24 is inserted through the first and second holes 48, 50, the first and second pockets 52, 54 and the cavity 60.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A panel sealing apparatus comprising:
   a panel defining an aperture;
   a sealing assembly including:
      a first component formed of an elastomeric material;
      a second component formed of a rigid material, with the second component at least partially surrounding the first component and secured to the first component to form a unit; and
      a plurality of clips disconnected from each other and each configured to be attached to the panel in the aperture separately from each other and attached to the panel separately from the unit, wherein the unit is attached to the clips to couple the unit to the panel after placement of the clips in the aperture.

2. The apparatus as set forth in claim 1 wherein each of the clips includes a first side and a second side opposing the first side, with the first side of each of the clips defining a slot to receive the panel which attaches the clips to the panel.

3. The apparatus as set forth in claim 2 wherein each of the clips includes a tab facing outwardly away from the first side, with the second component engaging the tab of each of the clips to attach the unit to the clips.

4. The apparatus as set forth in claim 3 wherein the second component includes a body having an outer surface facing the second side of each of the clips, with at least a portion of the outer surface and at least a portion of the second side of each of the clips being complementary to each other to limit movement of the second component relative to the clips.

5. The apparatus as set forth in claim 1 wherein each of the clips includes a tab, with the second component engaging the tab of each of the clips to attach the unit to the clips.

6. The apparatus as set forth in claim 5 wherein the second component includes a lip facing the clips, with the lip engaging the tab of each of the clips to attach the unit to the clips.

7. The apparatus as set forth in claim 6 wherein the lip includes a ramp and a platform, with the tab of each of the clips being biasable along the ramp and the platform to attach the unit to the clips.

8. The apparatus as set forth in claim 7 wherein the second component includes a body and a flange extending from the body, with the flange overlapping a portion of the body in a spaced relationship to present a space that allows the tab of each of the clips to bias therein.

\* \* \* \* \*